(12) United States Patent
Bunker

(10) Patent No.: US 9,243,503 B2
(45) Date of Patent: Jan. 26, 2016

(54) COMPONENTS WITH MICROCHANNEL COOLED PLATFORMS AND FILLETS AND METHODS OF MANUFACTURE

(75) Inventor: Ronald Scott Bunker, Waterford, NY (US)

(73) Assignee: General Electric Company, Niskayuna, NY (US)

( * ) Notice: Subject to any disclaimer, the term of this patent is extended or adjusted under 35 U.S.C. 154(b) by 577 days.

(21) Appl. No.: 13/478,517

(22) Filed: May 23, 2012

(65) Prior Publication Data

US 2013/0312941 A1 Nov. 28, 2013

(51) Int. Cl.
*F01D 5/18* (2006.01)
*F01D 5/28* (2006.01)

(52) U.S. Cl.
CPC ............... *F01D 5/187* (2013.01); *F01D 5/288* (2013.01); *F05D 2240/81* (2013.01); *Y02T 50/672* (2013.01); *Y02T 50/673* (2013.01); *Y02T 50/676* (2013.01)

(58) Field of Classification Search
CPC ............ F01D 5/08; F01D 5/18; F01D 25/08; F01D 5/20; F01D 5/187; F01D 5/288
See application file for complete search history.

(56) References Cited

U.S. PATENT DOCUMENTS

| | | | |
|---|---|---|---|
| 4,487,550 A | 12/1984 | Horvath et al. | |
| 4,893,987 A | 1/1990 | Lee et al. | |
| 5,382,135 A * | 1/1995 | Green | 416/97 R |
| 5,564,902 A | 10/1996 | Tomita | |
| 5,626,462 A | 5/1997 | Jackson et al. | |
| 5,640,767 A | 6/1997 | Jackson et al. | |
| 5,660,523 A | 8/1997 | Lee | |
| 5,875,549 A * | 3/1999 | McKinley | 29/889.2 |
| 6,059,530 A | 5/2000 | Lee | |

(Continued)

FOREIGN PATENT DOCUMENTS

| | | |
|---|---|---|
| CN | 1490497 A | 4/2004 |
| CN | 1611748 A | 5/2005 |

(Continued)

OTHER PUBLICATIONS

Hyams et al., "A Detailed Analysis of film Cooling Physics: Part III—Streamwise Injection With Shaped Holes," Journal of Turbomachinery, vol. 122, Issue 1, Jan. 2000, pp. 122-132.

(Continued)

*Primary Examiner* — Craig Kim
*Assistant Examiner* — Maxime Adjagbe
(74) *Attorney, Agent, or Firm* — Ann M. Agosti

(57) ABSTRACT

A component includes a substrate that has outer and inner surfaces. The inner surface defines at least one hollow, interior space. The outer surface defines pressure and suction sidewalls that are joined together at leading and trailing edges of the component and together form an airfoil portion of the component. The outer substrate surface further defines at least one platform and at least one fillet that extends between and integrally connects the airfoil to the respective platform. The outer surface defines one or more grooves that extend at least partially along a respective fillet. Each groove is in fluid communication with a respective hollow, interior space. The component further includes a coating disposed over at least a portion of the outer substrate surface and including at least a structural coating that extends over the groove(s). The groove (s) and the structural coating together define channel(s) for cooling the respective fillet.

25 Claims, 10 Drawing Sheets

(56) References Cited

U.S. PATENT DOCUMENTS

| | | | |
|---|---|---|---|
| 6,086,328 A | 7/2000 | Lee | |
| 6,164,914 A | 12/2000 | Correia et al. | |
| 6,190,129 B1 | 2/2001 | Mayer et al. | |
| 6,214,248 B1 | 4/2001 | Browning et al. | |
| 6,231,307 B1 | 5/2001 | Correia | |
| 6,234,755 B1 | 5/2001 | Bunker et al. | |
| 6,321,449 B2 | 11/2001 | Zhao et al. | |
| 6,368,060 B1 | 4/2002 | Fehrenbach et al. | |
| 6,383,602 B1 | 5/2002 | Fric et al. | |
| 6,405,435 B1 | 6/2002 | Konter et al. | |
| 6,412,541 B2 | 7/2002 | Roesler et al. | |
| 6,427,327 B1 | 8/2002 | Bunker | |
| 6,551,061 B2* | 4/2003 | Darolia et al. | 416/97 A |
| 6,582,194 B1* | 6/2003 | Birkner et al. | 416/97 R |
| 6,602,053 B2 | 8/2003 | Subramanian et al. | |
| 6,617,003 B1 | 9/2003 | Lee et al. | |
| 6,758,651 B2 | 7/2004 | Tomita et al. | |
| 6,905,302 B2 | 6/2005 | Lee et al. | |
| 6,921,014 B2 | 7/2005 | Hasz et al. | |
| 7,014,923 B2 | 3/2006 | Schnelli et al. | |
| 7,094,475 B2 | 8/2006 | Schnell et al. | |
| 7,186,167 B2 | 3/2007 | Joslin | |
| 7,216,428 B2 | 5/2007 | Memmen et al. | |
| 7,249,934 B2 | 7/2007 | Palmer et al. | |
| 7,302,990 B2 | 12/2007 | Bunker et al. | |
| 7,309,212 B2* | 12/2007 | Itzel et al. | 416/193 A |
| 7,597,536 B1* | 10/2009 | Liang | 415/138 |
| 7,600,972 B2 | 10/2009 | Benjamin et al. | |
| 7,625,180 B1* | 12/2009 | Liang | 416/97 R |
| 7,744,348 B2 | 6/2010 | Bezencon et al. | |
| 7,766,617 B1 | 8/2010 | Liang | |
| 7,775,768 B2 | 8/2010 | Devore et al. | |
| 7,905,706 B1* | 3/2011 | Liang | 416/96 R |
| 7,927,073 B2* | 4/2011 | Scott et al. | 416/97 R |
| 8,147,196 B2 | 4/2012 | Campbell et al. | |
| 8,192,831 B2* | 6/2012 | Rosenzweig et al. | 428/161 |
| 8,251,665 B2 | 8/2012 | Baldauf et al. | |
| 8,387,245 B2 | 3/2013 | Bunker et al. | |
| 8,668,454 B2* | 3/2014 | Wiebe | 416/97 R |
| 8,673,397 B2* | 3/2014 | Bunker et al. | 427/256 |
| 8,739,404 B2* | 6/2014 | Bunker et al. | 29/889.2 |
| 8,753,071 B2* | 6/2014 | Bunker | 415/115 |
| 8,857,055 B2 | 10/2014 | Wei et al. | |
| 8,905,713 B2 | 12/2014 | Bunker et al. | |
| 2001/0019696 A1* | 9/2001 | Jones | 416/1 |
| 2002/0141868 A1 | 10/2002 | Lee et al. | |
| 2002/0141869 A1 | 10/2002 | Lee et al. | |
| 2002/0182074 A1 | 12/2002 | Bunker | |
| 2002/0197160 A1 | 12/2002 | Liang | |
| 2003/0118444 A1 | 6/2003 | Lee et al. | |
| 2004/0096328 A1 | 5/2004 | Soechting et al. | |
| 2005/0013926 A1 | 1/2005 | Rutkowski et al. | |
| 2006/0153680 A1 | 7/2006 | Liang | |
| 2008/0138529 A1 | 6/2008 | Weaver et al. | |
| 2009/0074576 A1* | 3/2009 | Brostmeyer | 416/95 |
| 2010/0054954 A1 | 3/2010 | Itzel et al. | |
| 2010/0080688 A1 | 4/2010 | Bezencon et al. | |
| 2012/0076654 A1 | 3/2012 | Maldonado et al. | |
| 2013/0043009 A1 | 2/2013 | Bunker et al. | |

FOREIGN PATENT DOCUMENTS

| | | | |
|---|---|---|---|
| CN | 1910344 A | 2/2007 | |
| CN | 1970997 A | 5/2007 | |
| EP | 1387040 B1 | 4/2004 | |
| EP | 2436882 A2 | 4/2012 | |

OTHER PUBLICATIONS

Wei et al., "Curved Electrode and Electrochemical Machining Method and Assembly Employing the Same," U.S. Appl. No. 12/562,528, filed Sep. 18, 2009. G.E.

Zhang et al., Process and System for Forming Shaped Air Holes, U.S. Appl. No. 12/697,005, filed Jan. 29, 2010.

Lacy et al., "Hot Gas Path Component Cooling System," U.S. Appl. No. 12/765,372, filed Apr. 22, 2010.

Lacy et a., "Articles Which Include Chevron Film Cooling Holes, and Related Processes," U.S. Appl. No. 12/790,675, filed May 28, 2010.

Lambie et al., "An Overview on Micro-Meso Manufacturing Techniques for Micro-Heat Exchangers for Turbine Blade Cooling," International Journal Manufacturing Research, vol. 3, No. 1, 2008, pp. 3-26.

Bunker et al., "Components With Re-Entrant Shaped Cooling Channels and Methods of Manufacture," U.S. Appl. No. 12/943,624, filed Nov. 10, 2010.

Bunker et al., "Component and Methods of Fabricating and Coating a Component," U.S. Appl. No. 12/943,646, filed Nov. 10, 2010.

Bunker et al., "Method of Fabricating a Component Using a Fugitive Coating," U.S. Appl. No. 12/943,563, filed Nov. 10, 2010.

Bunker et al., "Components With Cooling Channels and Methods of Manufacture," U.S. Appl. No. 12/965,083, filed Dec. 10, 2010.

Bunker et al., "Method of Fabricating a Component Using a Two-Layer Structural Coating," U.S. Appl. No. 12/996,101, filed Dec. 13, 2010.

Bunker et al., "Turbine Components With Cooling Features and Methods of Manufacturing the Same," U.S. Appl. No. 12/953,177, filed Nov. 23, 2010.

Bunker, "Components With Cooling Channels and Methods of Manufacture," U.S. Appl. No. 13/026,595, filed Feb. 14, 2011.

Rebak et al., "Methods of Fabricating a Coated Component Using Multiple Types of Fillers," U.S. Appl. No. 13/083,701, filed Apr. 11, 2011.

Bunker et al., "Components With Cooling Channels Formed in Coating and Methods of Manufacture", U.S. Appl. No. 13/052,415, filed Mar. 21, 2011.

Rebak et al., "Component and Methods of Fabricating a Coated Component Using Multiple Types of Fillers," U.S. Appl. No. 13/095,129, filed Apr. 27, 2011.

Bunker, "Components With Cooling Channels and Methods of Manufacture", U.S. Appl. No. 13/168,144, filed Jun. 24, 2011.

Bunker et al., "Components With Cooling Channels and Methods of Manufacture", U.S. Appl. No. 13/210,697, filed Aug. 16, 2011.

Bunker, "Repair Methods for Cooled Components", U.S. Appl. No. 13/267,617, filed Oct. 6, 2011.

Bunker et al., Components With Laser Cladding and Methods of Manufacture, U.S. Appl. No. 13/278,816, filed Oct. 21, 2011.

Bunker, "Components With Microchannel Cooling", U.S. Appl. No. 13/326,540, filed Dec. 15, 2011.

Bunker, "Components With Microchannel Cooling", U.S. Appl. No. 13/448,469, filed Apr. 17, 2012.

Search Report and Written Opinion from corresponding EP Application No. 13168633 dated Dec. 9, 2013.

Unofficial English translation of Office Action issued in connection with corresponding CN Application No. 201310194395.9 on Aug. 21, 2015.

* cited by examiner

COMPONENTS WITH MICROCHANNEL COOLED PLATFORMS AND FILLETS AND METHODS OF MANUFACTURE

BACKGROUND

The invention relates generally to gas turbine engines, and, more specifically, to micro-channel cooling therein.

In a gas turbine engine, air is pressurized in a compressor and mixed with fuel in a combustor for generating hot combustion gases. Energy is extracted from the gases in a high pressure turbine (HPT), which powers the compressor, and in a low pressure turbine (LPT), which powers a fan in a turbofan aircraft engine application, or powers an external shaft for marine and industrial applications.

Engine efficiency increases with temperature of combustion gases. However, the combustion gases heat the various components along their flowpath, which in turn requires cooling thereof to achieve a long engine lifetime. Typically, the hot gas path components are cooled by bleeding air from the compressor. This cooling process reduces engine efficiency, as the bled air is not used in the combustion process.

Gas turbine engine cooling art is mature and includes numerous patents for various aspects of cooling circuits and features in the various hot gas path components. For example, the combustor includes radially outer and inner liners, which require cooling during operation. Turbine nozzles include hollow vanes supported between outer and inner bands, which also require cooling. Turbine rotor blades are hollow and typically include cooling circuits therein, with the blades being surrounded by turbine shrouds, which also require cooling. The hot combustion gases are discharged through an exhaust which may also be lined, and suitably cooled.

In all of these exemplary gas turbine engine components, thin walls of high strength superalloy metals are typically used to reduce component weight and minimize the need for cooling thereof. Various cooling circuits and features are tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. However, this cooling strategy typically results in comparatively low heat transfer rates and non-uniform component temperature profiles.

For example, the conventional design for cooling of turbine airfoils and endwalls/platforms utilizes investment cast cooling passages in the airfoil and platform. Because the cooling medium is on the opposite side of the cast wall thickness from the heat source (hot gas), there is a substantial thermal resistance and a large thermal gradient and stress through the fillets. Thus, it is convention that the fillets are made as small as feasible to decrease thermal issues, while also satisfying load requirements. (The fillets require thicker walls to carry the load of the blades in rotation.) Thus, the thermal requirements are at odds with the load requirements for the fillets, for conventionally cooled hot gas path components.

It would therefore be desirable to provide improved cooling of the fillets for hot gas path components.

BRIEF DESCRIPTION

One aspect of the present invention resides in a component that includes a substrate having an outer surface and an inner surface, where the inner surface defines at least one hollow, interior space, and the outer surface of the substrate defines a pressure sidewall and a suction sidewall that are joined together at a leading edge and at a trailing edge of the component and together form an airfoil portion of the component. The outer surface of the substrate further defines at least one platform and at least one fillet that extends between and integrally connects the airfoil to the respective platform. The outer surface defines one or more grooves that extend at least partially along a respective fillet, where each groove is in fluid communication with a respective hollow, interior space. The component further includes a coating disposed over at least a portion of the outer surface of the substrate, where the coating comprises at least a structural coating that extends over the groove(s), such that the groove(s) and the structural coating together define one or more channels for cooling the respective fillet.

Another aspect of the invention resides in a component that includes a substrate having an outer surface and an inner surface, where the inner surface defines at least one hollow, interior space, and the outer surface of the substrate defines a pressure sidewall and a suction sidewall that are joined together at a leading edge and at a trailing edge of the component and together form an airfoil portion of the component. The outer surface of the substrate further defines at least one platform and at least one fillet that extends between and integrally connects the airfoil to the respective platform, and the outer surface defines one or more grooves that extend at least partially along the respective platform. Each groove is in fluid communication with a respective hollow, interior space. The component further includes a coating disposed over at least a portion of the outer surface of the substrate, where the coating comprises at least a structural coating that extends over the groove(s), such that the groove(s) and the structural coating together define one or more channels for cooling the respective platform.

Yet another aspect of the invention resides in a method of forming cooling channels in a component comprising a substrate having an outer surface and an inner surface, where the inner surface defines at least one hollow, interior space, and the outer surface of the substrate defines a pressure side wall and a suction side wall that are joined together at a leading edge and at the trailing edge of the component. The outer surface of the substrate further defines at least one platform and at least one fillet that extends between and integrally connects the airfoil to the respective platform. The method includes forming at least one groove in the outer surface of the substrate that extends at least partially along a respective fillet or at least partially along the respective platform. The method further includes disposing a coating over at least a portion of the outer surface of the substrate. The coating comprises at least a structural coating that extends over the groove(s), such that the groove(s) and the structural coating together define one or more channels for cooling at least one of the respective fillet and platform of the component.

DRAWINGS

These and other features, aspects, and advantages of the present invention will become better understood when the following detailed description is read with reference to the accompanying drawings in which like characters represent like parts throughout the drawings, wherein.

Figure 3:
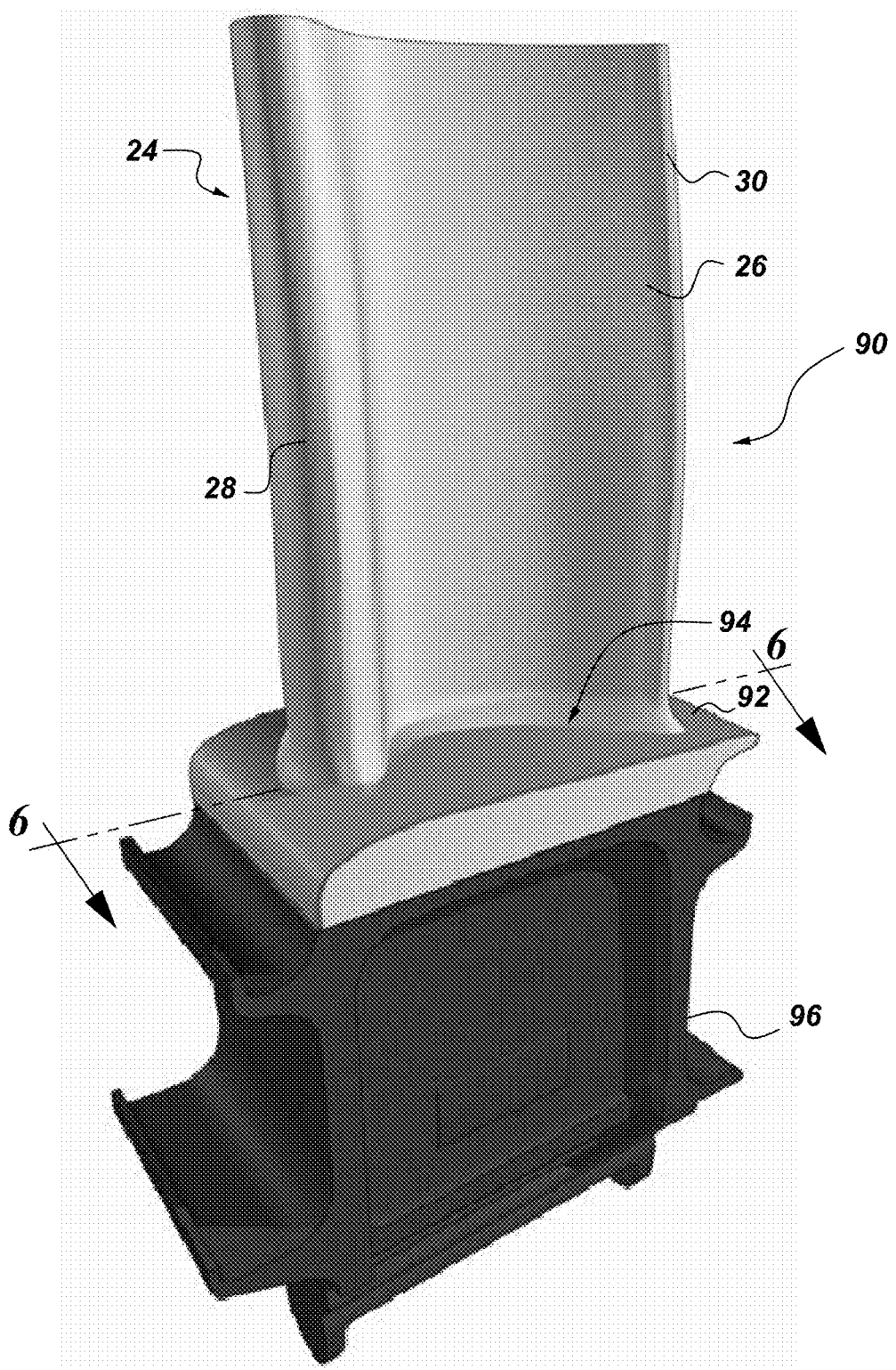
FIG. 3 shows an example component with an airfoil connected to a platform via a fillet.
Figure 4:
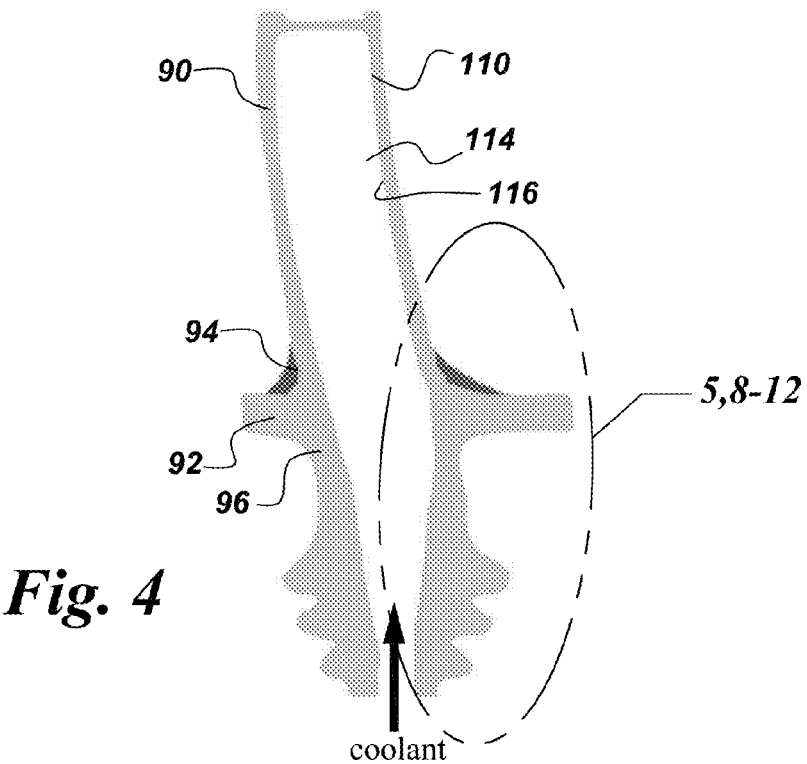
Figure 5:
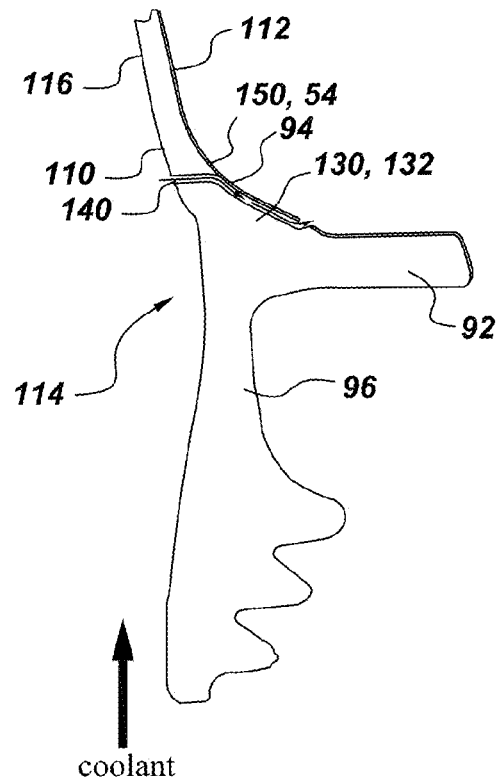
Figure 6:
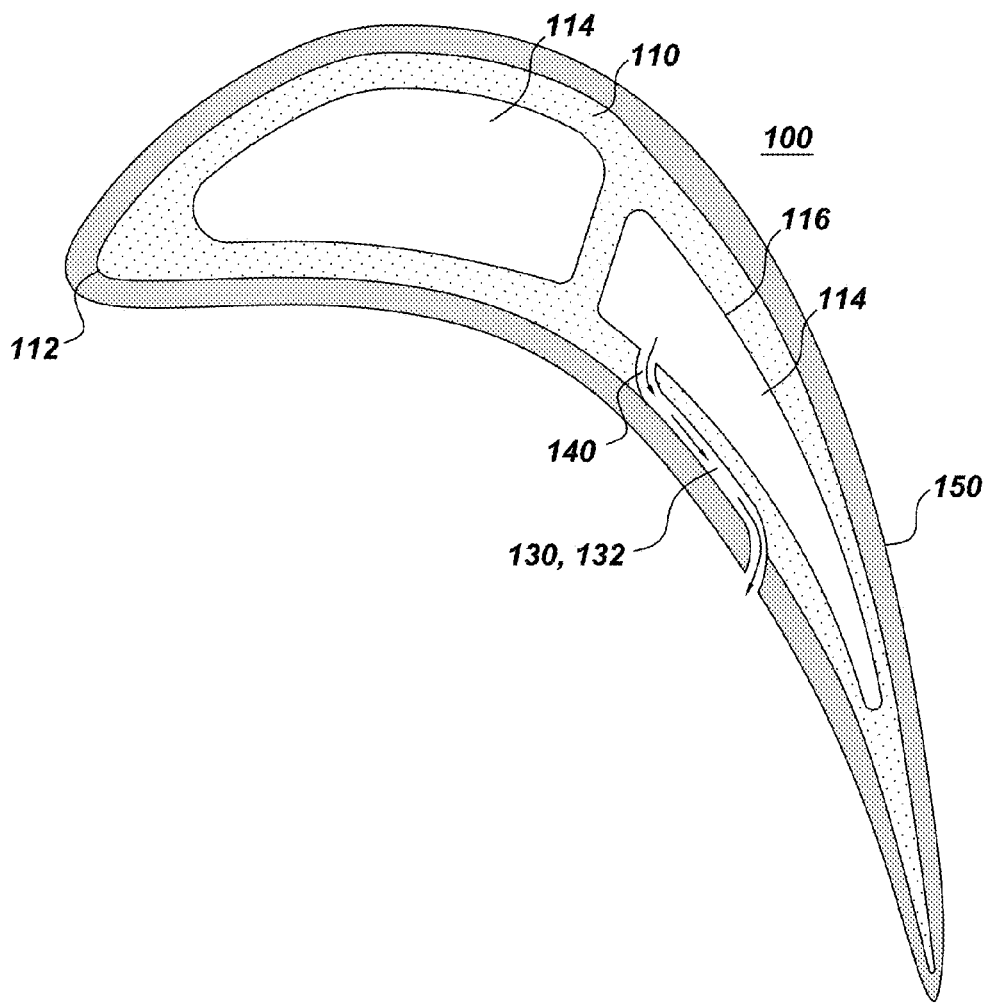
Figure 7:
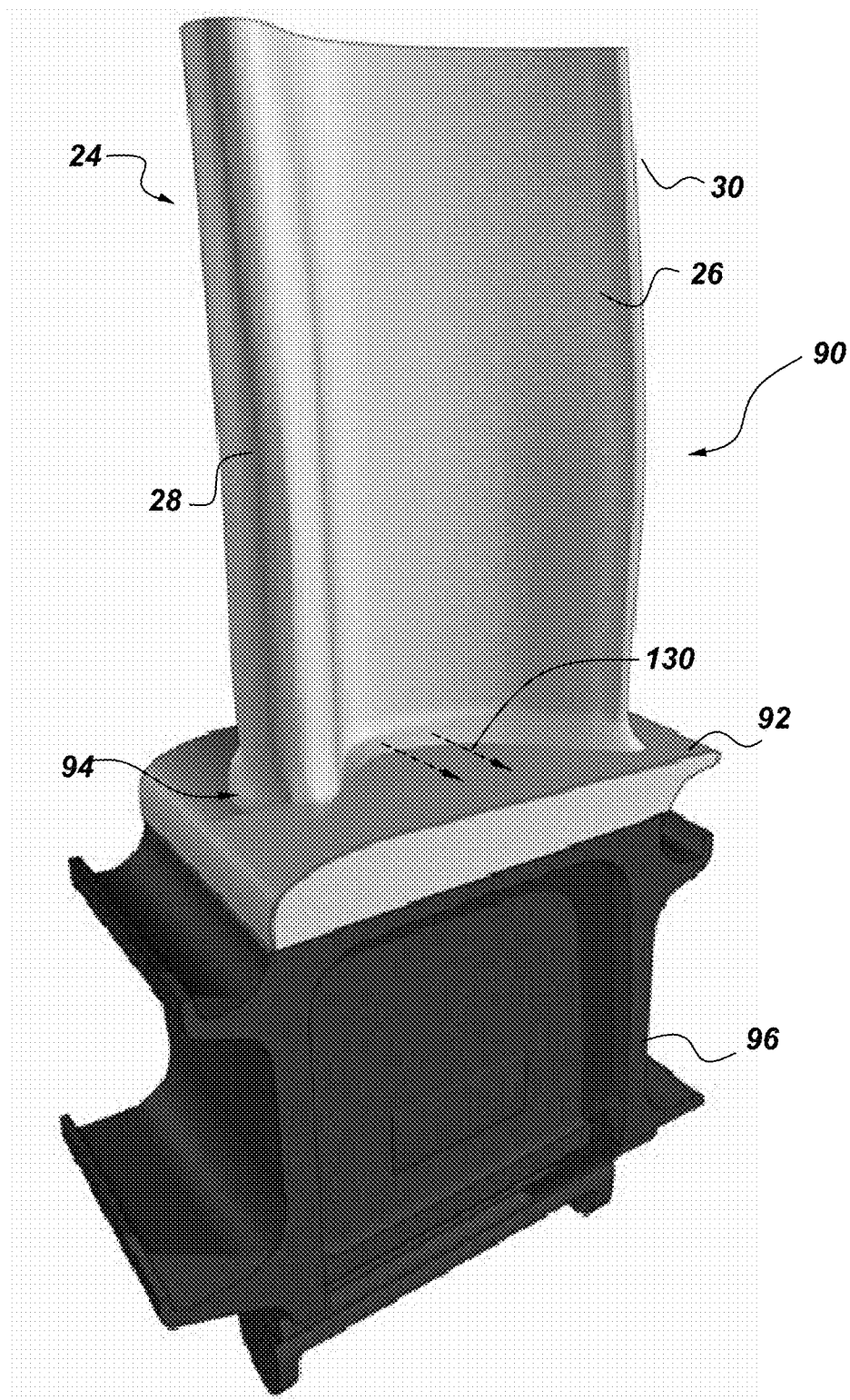
Figure 8:
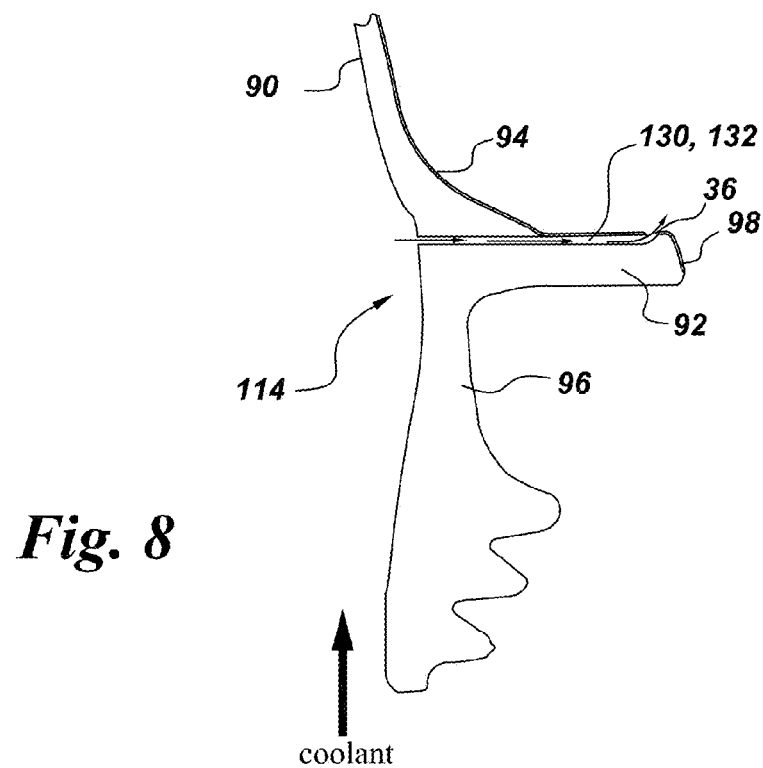
Figure 9:
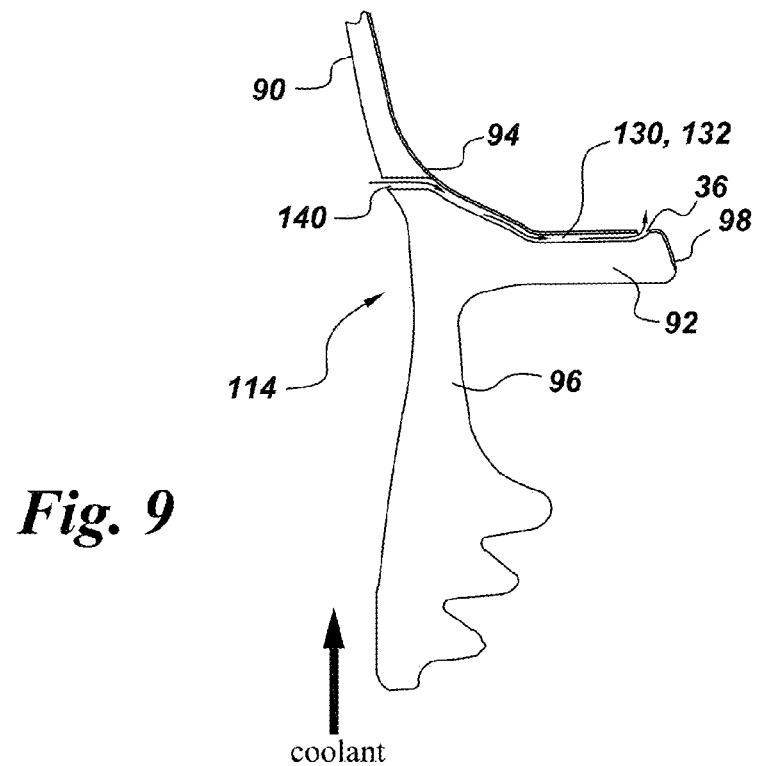
Figure 10:
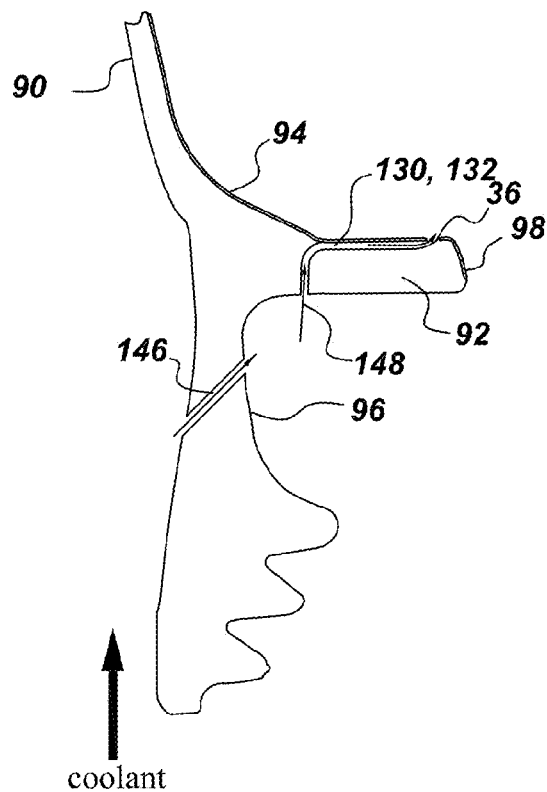
Figure 11:
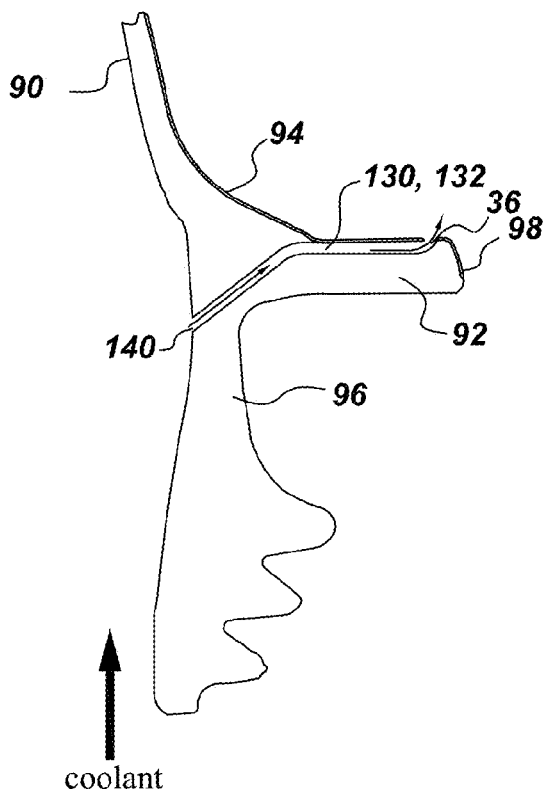
Figure 12:
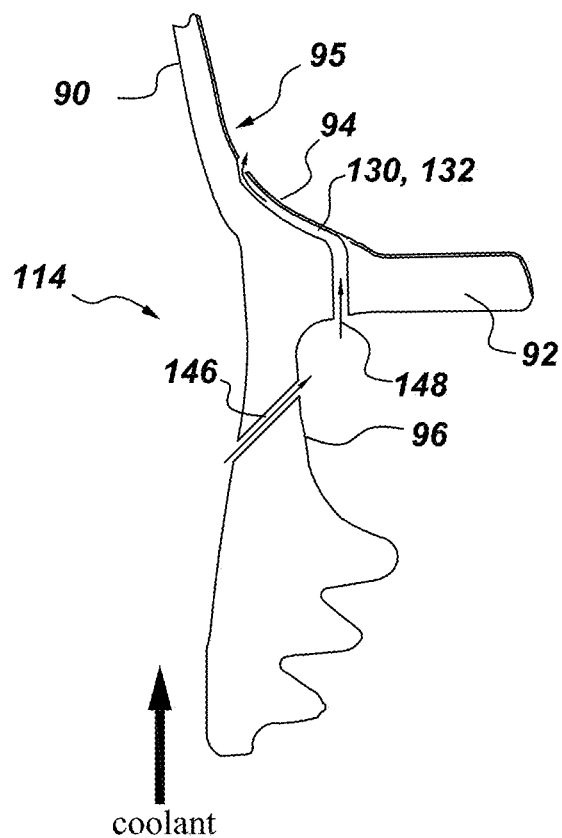
Figure 13:
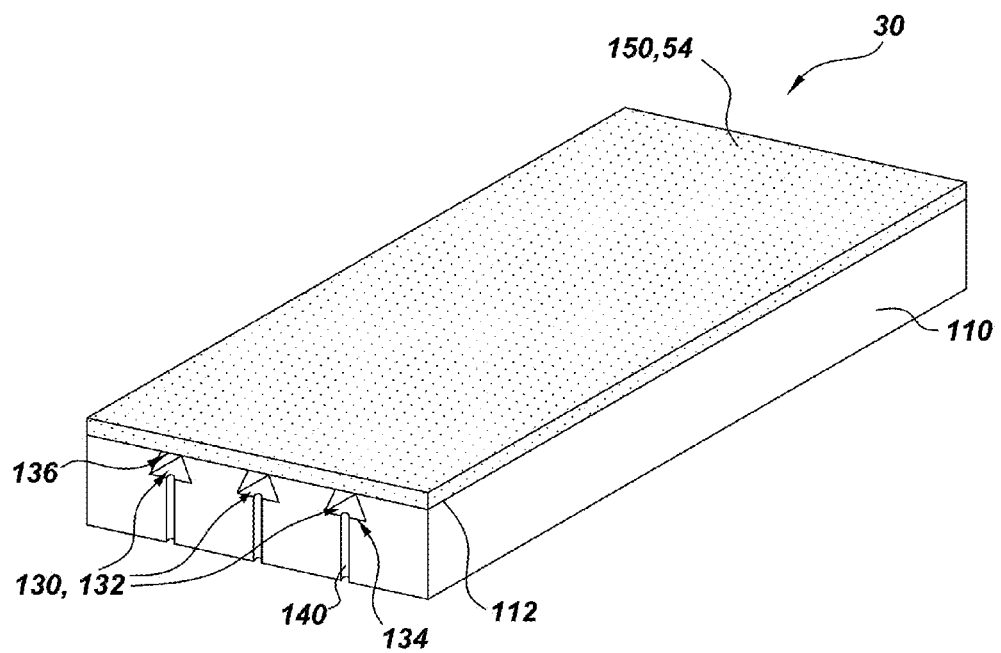
Figure 14:
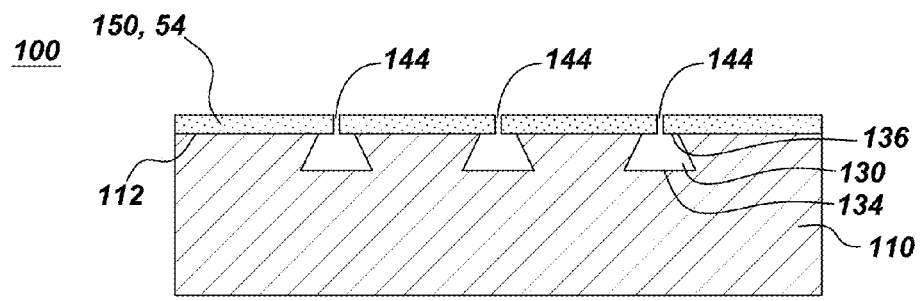
Figure 15:
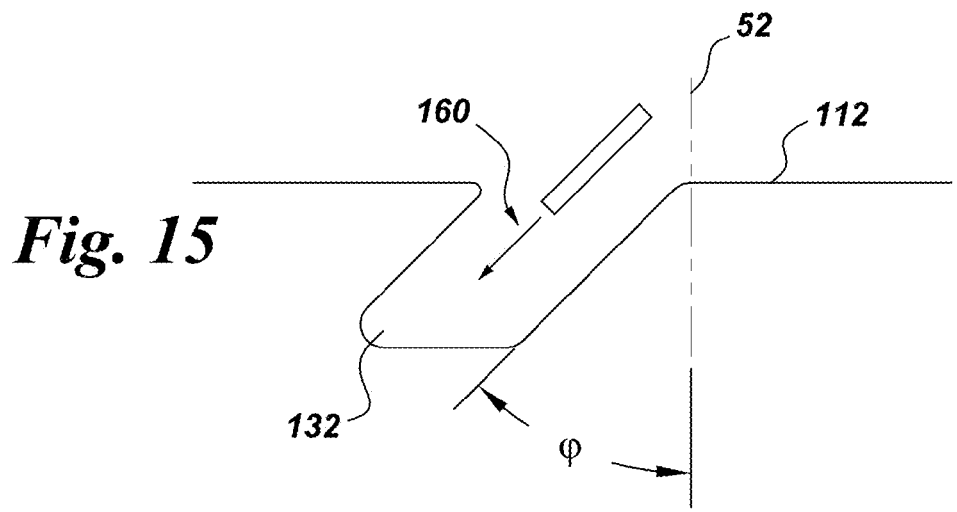
Figure 16:
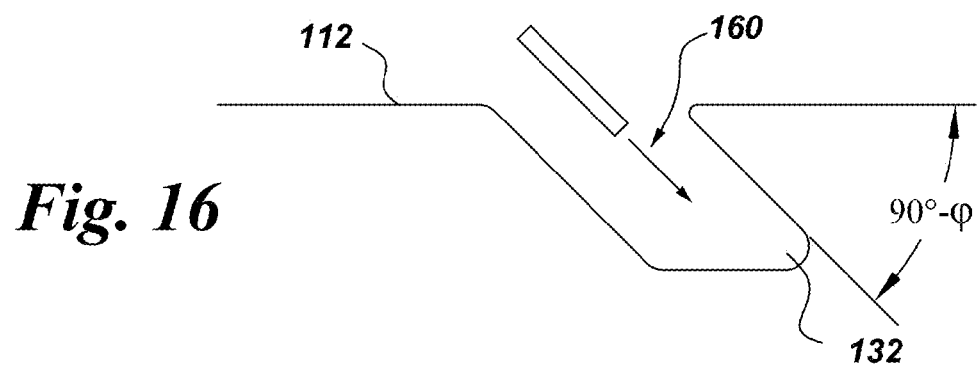
Figure 17:
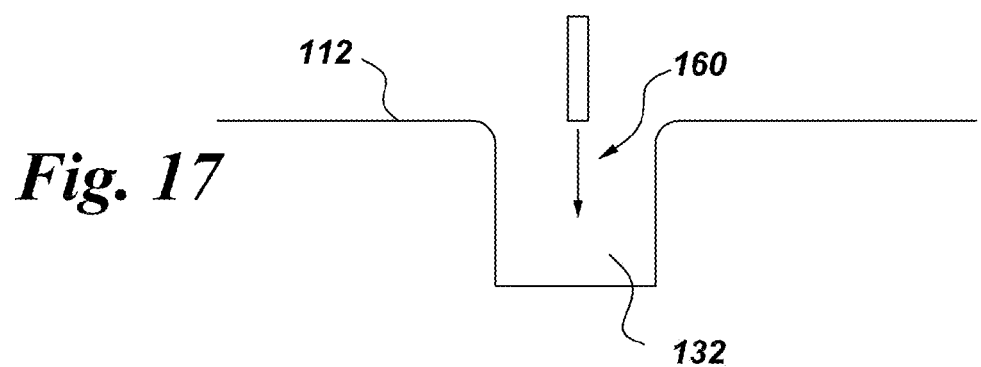

FIG. 4 schematically depicts, in cross-sectional view, an example cooled component, with coolant entering a hollow, interior space within the component;

FIG. 5 schematically depicts, in cross-sectional view, the circled portion of the component shown in FIG. 4, and illustrates a cooling channel extending radially along the fillet to convey coolant from the hollow, interior space to the platform;

FIG. 6 schematically depicts, a cross-section of the component shown in FIG. 4 taken through the fillet and illustrates a cooling channel extending axially along the fillet to convey coolant from the hollow, interior space to the platform;

FIG. 7 shows the component of FIG. 3 with two cooling channels extending axially-radially along the fillet to convey coolant from the hollow, interior space to the platform and indicated by dashed lines;

FIG. 8 schematically depicts, in cross-sectional view, the circled portion of the component shown in FIG. 4, and illustrates a cooling channel extending axially and/or longitudinally along the platform to convey coolant from the hollow, interior space to the platform;

FIG. 9 schematically depicts, in cross-sectional view, the circled portion of the component shown in FIG. 4, and illustrates a cooling channel extending radially along the fillet and then axially and/or longitudinally along the platform to convey coolant from the hollow, interior space to the platform;

FIG. 10 schematically depicts, in cross-sectional view, the circled portion of the component shown in FIG. 4, and illustrates a cooling channel extending axially and/or longitudinally along the platform, to convey coolant from the hollow, interior space to the platform, where the coolant flows through a passage extending through the shank and through an access hole that extends partially through the platform;

FIG. 11 schematically depicts, in cross-sectional view, the circled portion of the component shown in FIG. 4, and illustrates a cooling channel extending axially and/or longitudinally along the platform, to convey coolant from the hollow, interior space to the platform, where the coolant flows through an access hole that extends partially through the shank;

FIG. 12 schematically depicts, in cross-sectional view, the circled portion of the component shown in FIG. 4, and illustrates a cooling channel extending radially along the fillet, where the coolant flows from the hollow, interior space through a passage extending through the shank, to an exterior region of the shank, and then through an access hole that extends at least partially through the platform;

FIG. 13 schematically depicts, in perspective view, three example micro-channels that extend partially along the surface of the substrate and channel coolant to the trailing edge of the airfoil;

FIG. 14 is a cross-sectional view of three example re-entrant shaped channels, where porous slots extend through a structural coating;

FIG. 15 illustrates a first pass of an abrasive liquid jet at an angle φ for forming a re-entrant groove;

FIG. 16 illustrates a second pass of the abrasive liquid jet at an opposite angle 180-φ for forming the re-entrant groove; and FIG. 17 illustrates an optional third pass of the abrasive liquid jet normal to the groove, for forming the re-entrant groove.

DETAILED DESCRIPTION

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). In addition, the term "combination" is inclusive of blends, mixtures, alloys, reaction products, and the like.

Moreover, in this specification, the suffix "(s)" is usually intended to include both the singular and the plural of the term that it modifies, thereby including one or more of that term (e.g., "the passage hole" may include one or more passage holes, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

Figure 1:
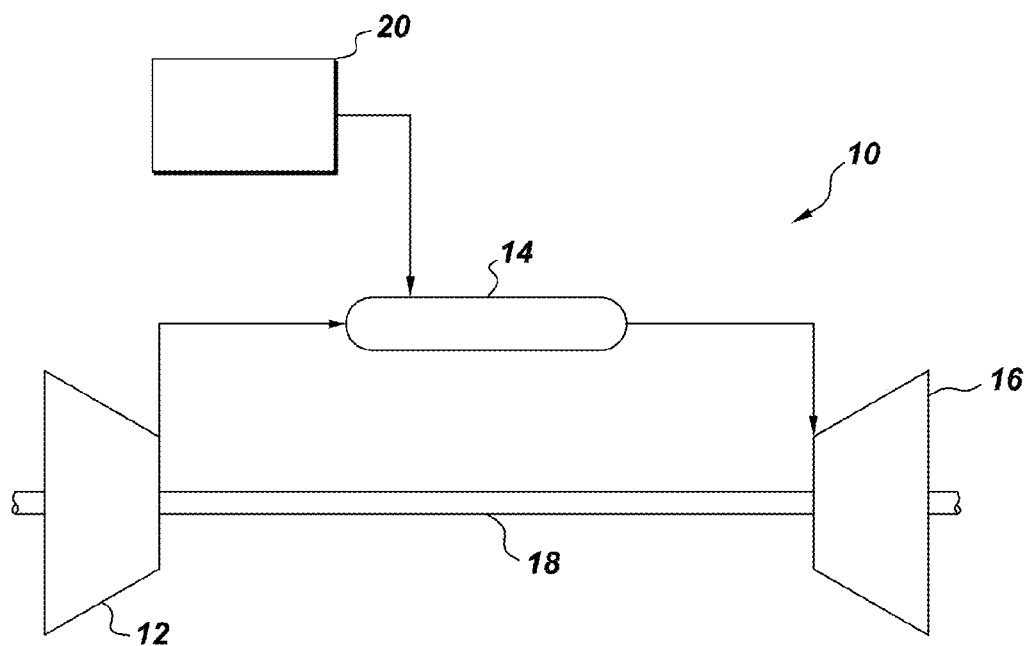
FIG. 1 is a schematic illustration of a gas turbine system.

FIG. 1 is a schematic diagram of a gas turbine system 10. The system 10 may include one or more compressors 12, combustors 14, turbines 16, and fuel nozzles 20. The compressor 12 and turbine 16 may be coupled by one or more shaft 18. The shaft 18 may be a single shaft or multiple shaft segments coupled together to form shaft 18.

The gas turbine system 10 may include a number of hot gas path components 100. A hot gas path component is any component of the system 10 that is at least partially exposed to a high temperature flow of gas through the system 10. For example, bucket assemblies (also known as blades or blade assemblies), nozzle assemblies (also known as vanes or vane assemblies), shroud assemblies, transition pieces, retaining rings, and compressor exhaust components are all hot gas path components. However, it should be understood that the hot gas path component 100 of the present invention is not limited to the above examples, but may be any component that is at least partially exposed to a high temperature flow of gas. Further, it should be understood that the hot gas path component 100 of the present disclosure is not limited to components in gas turbine systems 10, but may be any piece of machinery or component thereof that may be exposed to high temperature flows.

When a hot gas path component 100 is exposed to a hot gas flow, the hot gas path component 100 is heated by the hot gas flow and may reach a temperature at which the hot gas path component 100 is substantially degraded or fails. Thus, in order to allow system 10 to operate with hot gas flow at a high temperature, increasing the efficiency, performance and/or life of the system 10, a cooling system for the hot gas path component 100 is required.

Micro-channel cooling has the potential to significantly reduce cooling requirements by placing the cooling as close as possible to the heated region, thus reducing the temperature difference between the hot side and cold side of the main load bearing substrate material for a given heat transfer rate. In general, the cooling system of the present disclosure includes a series of small channels, or micro-channels, formed in the surface of the hot gas path component 100. For industrial sized power generating turbine components, "small" or "micro" channel dimensions would encompass approximate depths and widths in the range of 0.25 mm to 1.5 mm, while for aviation sized turbine components channel dimensions would encompass approximate depths and widths in the range of 0.1 mm to 0.5 mm. The hot gas path component may be provided with a protective coating. A cooling fluid may be provided to the channels from a plenum, and the cooling fluid may flow through the channels, cooling the hot gas path component.

Figure 2:
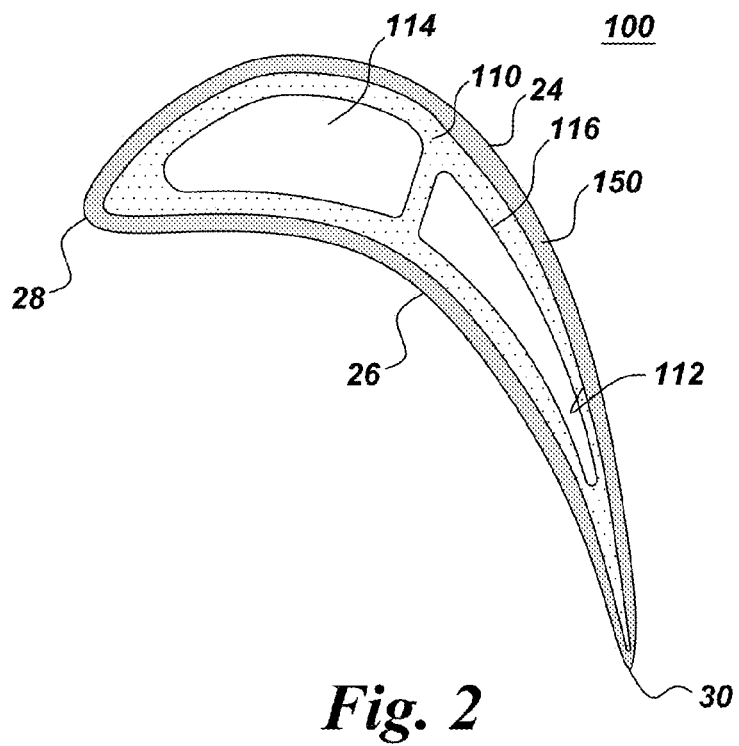
FIG. 2 is a schematic cross-section of an example airfoil configuration.

A component 100 is described with reference to FIGS. 2-7, 9 and 11-17. As indicated, for example, in FIGS. 2 and 4, the component 100 includes a substrate 110 having an outer surface 112 and an inner surface 116. As indicated, for example in FIGS. 2 and 4, the inner surface 116 defines at least one hollow, interior space 114. As indicated in FIGS. 2 and 3, for example, the outer surface 112 of the substrate 110 defines a pressure sidewall 24 and a suction sidewall 26, where the pressure and suction sidewalls 24, 26 are joined together at a leading edge 28 and at a trailing edge 30 of the component 100 and together form an airfoil 90 portion of the component. As shown in FIGS. 2 and 3, the suction side 26 is convex-shaped, and the pressure side 24 is concave-shaped. As indicated in FIGS. 3 and 4, for example, the outer surface 112 of the substrate 110 further defines at least one platform 92 and at least one fillet 94 that extends between and integrally connects the airfoil 90 to the respective platform 92. Although each of the illustrated configurations includes only one platform and one fillet, the component may comprise a nozzle or vane, which has two endwalls (which may be viewed as platforms) and respective fillets. In addition, the component may comprise a blade with an attached tip shroud or partial-span shroud, such that the component has two or more "platforms" and respective fillets. It should further be noted that the fillet is integrally formed as a portion of the complete cast part and includes the complete bulk material that forms the transition from a radially oriented airfoil to an axial-longitudinal oriented platform or endwall.

As indicated, for example in FIGS. 5, 7 and 9, the outer surface 112 defines one or more grooves 132 that extend at least partially along the respective fillet 94. As indicated in FIG. 5, for example, each groove 132 is in fluid communication with a respective hollow, interior space 114.

Typically, the substrate 110 is cast prior to forming the groove(s) 132. As discussed in U.S. Pat. No. 5,626,462, Melvin R. Jackson et al., "Double-wall airfoil," which is incorporated herein in its entirety, substrate 110 may be formed from any suitable material. Depending on the intended application for component 100, this could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high temperature strength and high temperature creep resistance that are advantageous for use in turbine engine applications used for aircraft. In the case of Nb-base alloys, coated Nb-base alloys having superior oxidation resistance will be preferred, particularly those alloys comprising Nb-(27-40)Ti-(4.5-10.5)Al-(4.5-7.9)Cr-(1.5-5.5)Hf-(0-6)V, where the composition ranges are in atom percent. The substrate material may also comprise a Nb-base alloy that contains at least one secondary phase, such as a Nb-containing intermetallic compound comprising a silicide, carbide or boride. Such alloys are composites of a ductile phase (i.e., the Nb-base alloy) and a strengthening phase (i.e., a Nb-containing intermetallic compound). For other arrangements, the substrate material comprises a molybdenum based alloy, such as alloys based on molybdenum (solid solution) with $Mo_5SiB_2$ and $Mo_3Si$ second phases. For other configurations, the substrate material comprises a ceramic matrix composite, such as a silicon carbide (SiC) matrix reinforced with SiC fibers. For other configurations the substrate material comprises a TiAl-based intermetallic compound.

The grooves 132 may be formed using a variety of techniques. Example techniques for forming the groove(s) 132 include abrasive liquid jet, plunge electrochemical machining (ECM), electric discharge machining (EDM) with a spinning electrode (miffing EDM), and laser machining Example laser machining techniques are described in commonly assigned, U.S. patent application Ser. No. 12/697,005, "Process and system for forming shaped air holes" filed Jan. 29, 2010, which is incorporated by reference herein in its entirety. Example EDM techniques are described in commonly assigned U.S. patent application Ser. No. 12/790,675, "Articles which include chevron film cooling holes, and related processes," filed May 28, 2010, which is incorporated by reference herein in its entirety.

For particular processes, the grooves are formed using an abrasive liquid jet (not shown). Example water jet drilling processes and systems are disclosed in commonly assigned U.S. patent application Ser. No. 12/790,675, "Articles which include chevron film cooling holes, and related processes," filed May 28, 2010, which is incorporated by reference herein in its entirety. As explained in U.S. patent application Ser. No. 12/790,675, the water jet process typically utilizes a high-velocity stream of abrasive particles (e.g., abrasive "grit"), suspended in a stream of high pressure water. The pressure of the water may vary considerably, but is often in the range of about 35-620 MPa. A number of abrasive materials can be used, such as garnet, aluminum oxide, silicon carbide, and glass beads. Beneficially, the capability of abrasive liquid jet machining techniques facilitates the removal of material in stages to varying depths, with control of the shaping. For example, this allows the interior access holes 140 (described below with reference to FIGS. 5, 6, 11 and 13) feeding the channel to be drilled either as a straight hole of constant cross section, a shaped hole (elliptical etc.), or a converging or diverging hole.

In addition, and as explained in U.S. patent application Ser. No. 12/790,675, the water jet system can include a multi-axis computer numerically controlled (CNC) unit (not shown). The CNC systems themselves are known in the art, and described, for example, in U.S. Patent Publication 1005/0013926 (S. Rutkowski et al), which is incorporated herein by reference. CNC systems allow movement of the cutting tool along a number of X, Y, and Z axes, as well as rotational axes.

More particularly and as shown in FIGS. 15-17, each groove 132 may be formed by directing an abrasive liquid jet 160 at a lateral angle relative to the surface 112 of the substrate 110 in a first pass of the abrasive liquid jet 160 (FIG. 15) and then making a subsequent pass at an angle substantially opposite to that of the lateral angle (FIG. 16), such that each groove narrows at the opening 136 of the groove and thus comprises a re-entrant shaped groove (as discussed below with reference to FIG. 6). Typically, multiple passes will be performed to achieve the desired depth and width for the groove. This technique is described in commonly assigned, U.S. patent application Ser. No. 12/943,624, Bunker et al., "Components with re-entrant shaped cooling channels and methods of manufacture," which is incorporated by reference herein in its entirety. In addition, the step of forming the re-entrant shaped grooves 132 may further comprise performing an additional pass where the abrasive liquid jet is directed toward the base 134 of the groove 132 at one or more angles between the lateral angle and a substantially opposite angle, such that material is removed from the base 134 of the groove 132.

Referring now to FIGS. 2, 5, 6, and 13, for example, the component 100 further includes a coating 150 disposed over at least a portion of the outer surface 112 of the substrate 110. As indicated, for example in FIGS. 13 and 14, the coating 150 comprises at least a structural coating 54. Coating 150 comprises a suitable material and is bonded to the component. For the example arrangements shown in FIGS. 5-7, the structural coating 54 extends over the one or more grooves 132, such that the one or more grooves 132 and the structural coating 54 together define one or more channels 130 for cooling the respective fillet 94.

For particular configurations, the coating 150 has a thickness in the range of 0.1-2.0 millimeters, and more particularly, in the range of 0.2 to 1 millimeters, and still more particularly 0.2 to 0.5 millimeters for industrial components. For aviation components, this range is typically 0.1 to 0.25 millimeters. However, other thicknesses may be utilized depending on the requirements for a particular component 100.

The coating 150 comprises structural coating layers and may further include optional additional coating layer(s). The coating layer(s) may be deposited using a variety of techniques. For particular processes, the structural coating layer(s) are deposited by performing an ion plasma deposition (cathodic arc). Example ion plasma deposition apparatus and method are provided in commonly assigned, US Published Patent Application No. 20080138529, Weaver et al, "Method and apparatus for cathodic arc ion plasma deposition," which is incorporated by reference herein in its entirety. Briefly, ion plasma deposition comprises placing a consumable cathode formed of a coating material into a vacuum environment within a vacuum chamber, providing a substrate 110 within the vacuum environment, supplying a current to the cathode to form a cathodic arc upon a cathode surface resulting in arc-induced erosion of coating material from the cathode surface, and depositing the coating material from the cathode upon the substrate surface 112.

Non-limiting examples of a coating deposited using ion plasma deposition include structural coatings, as well as bond coatings and oxidation-resistant coatings, as discussed in greater detail below with reference to U.S. Pat. No. 5,626,462, Jackson et al., "Double-wall airfoil." For certain hot gas path components 100, the structural coating comprises a nickel-based or cobalt-based alloy, and more particularly comprises a superalloy or a (Ni,Co)CrAlY alloy. For example, where the substrate material is a Ni-base superalloy containing both γ and γ' phases, structural coating may comprise similar compositions of materials, as discussed in greater detail below with reference to U.S. Pat. No. 5,626,462.

For other process configurations, a structural coating is deposited by performing at least one of a thermal spray process and a cold spray process. For example, the thermal spray process may comprise combustion spraying or plasma spraying, the combustion spraying may comprise high velocity oxygen fuel spraying (HVOF) or high velocity air fuel spraying (HVAF), and the plasma spraying may comprise atmospheric (such as air or inert gas) plasma spray, or low pressure plasma spray (LPPS, which is also known as vacuum plasma spray or VPS). In one non-limiting example, a (Ni,Co)CrAlY coating is deposited by HVOF or HVAF. Other example techniques for depositing the structural coating include, without limitation, sputtering, electron beam physical vapor deposition, electroless plating, and electroplating.

For certain configurations, it is desirable to employ multiple deposition techniques for depositing structural and optional additional coating layers. For example, a first structural coating layer may be deposited using an ion plasma deposition, and a subsequently deposited layer and optional additional layers (not shown) may be deposited using other techniques, such as a combustion spray process or a plasma spray process. Depending on the materials used, the use of different deposition techniques for the coating layers may provide benefits in properties, such as, but not restricted to strain tolerance, strength, adhesion, and/or ductility.

For the configuration shown in FIG. 3, the component 100 comprises a turbine blade 100, for the arrangement shown in FIG. 5, the substrate 110 further defines at least one access channel 140 that extends between and provides fluid communication between a respective hollow, interior space 114 and at least one cooling channel 130. The interior access holes 140 supplying the respective cooling channels may be drilled either as a straight hole of constant cross section, a shaped hole (elliptical etc.), or a converging or diverging hole. Methods for forming the access holes are provided in commonly assigned U.S. patent application Ser. No. 13/210,697, Ronald S. Bunker et al., "Components with cooling channels and methods of manufacture," which is incorporated by reference herein in its entirety.

There are a number of possible arrangements for the cooling channels 130. For the example configuration shown in FIG. 5, at least one of the cooling channels 130 extends radially along the fillet 94. It should be noted that although the cross-section depicted in FIG. 5 shows only one cooling channel extending radially along the fillet, multiple cooling channels may extend radially along the fillet within different cross-sections of the component. Beneficially, this radial configuration cools the fillet under the coating, which significantly reduces the thermal gradients and thermal stresses in the fillet, relative to a conventionally cooled component. As a result, larger fillets may be used, which helps satisfy the load requirements for the rotating component, while also decreasing the casting cost (as larger fillets are not as restrictive to casting yields or to the adhesion of coatings).

Similarly, for the example configuration shown in FIG. 6, at least one of the cooling channels 130 extends axially along the fillet 94. It should be noted that although the cross-section depicted in FIG. 6 shows only one cooling channel extending axially along the fillet, multiple cooling channels may extend axially along the fillet. Beneficially, this axial arrangement concentrates the cooling within the fillet.

For the example configuration shown in FIG. 7, at least one of the cooling channels 130 extends axially-radially along the fillet. The specific number (two) of cooling channels indicated in FIG. 7 is merely exemplary, and one or many cooling channels may extend axially-radially along the fillet.

As can be seen from the figures, the cooling channels can be configured several ways. The particular configuration may be selected in part, to derive some benefit from manufacturing, since not all locations are equally accessible by the machining devices. It can also be easier to machine either an axial channel or a radial channel, since one plane is held fixed in space, than to machine the axial-radial type, where the device must traverse a compound surface radius. For cooling purposes, because the airfoils must have some internal structure, such as ribs for aeromechanical response, the coolant supply holes have some restrictions in placement, hence particular components may require the use of an axial-radial channel In other instances, the fillet may be the life limiting region and benefit the most from simply having axial channels. Also factoring into this are the stress concentration factors from the channels, which can be minimized by particular orientations for the channels.

As noted above, the grooves 132 may have a number of different geometries. For the arrangements shown in FIGS. 13 and 14, each groove 132 has an opening 136, and each groove 132 narrows at the opening 136 of the groove 132 and thus comprises a re-entrant shaped 132, such that each cooling channel 130 comprises a re-entrant shaped cooling channel 130. Re-entrant shaped grooves are described in U.S. patent application Ser. No. 12/943,624. For particular configurations, the base 134 of a re-entrant shaped groove 132 is at least 2 times wider than the top 136 of the respective groove 132. For example, if the base 134 of the groove 132 is 0.75 millimeters, the top 136 would be less than 0.375 millimeters in width, for this configuration. For more particular configurations, the base 134 of the re-entrant shaped groove 132 is at least 3 times wider than the top 136 of the respective groove 132, and still more particularly, the base 134 of the re-entrant shaped groove 132 is in a range of about 3-4 times wider than the top 136 of the respective groove 132. Beneficially, a large base to top ratio increases the overall cooling volume for the micro-channel 130, while facilitating the deposition of the coating 150 over the groove 132 (without the use of a sacrificial filler) without having the coating 150 fill the groove 132.

For certain configurations, the structural coating 54 completely bridges the respective grooves 132, such that the coating 150 seals the respective micro-channels 130. For other configurations, however, the structural coating 54 defines one or more permeable slots 144 (for example, porosity in the coating or a gap in the coating), such that the structural coating does not completely bridge each of the one or more grooves 132, as indicated in FIG. 14. Although FIG. 14 schematically depicts the slots 144 as having a uniform and straight geometry, typically each slot 144 has an irregular geometry, with the width of the slot 144 varying, as the coating 150 is applied and builds up a thickness. Initially, as the first part of the coating 150 is applied to the substrate 110, the width of the slot 144 may be as much as 50% of the width of the top 136 of the micro-channel 130. The slot 144 may then narrow down to 5% or less of the width of the top 136, as the coating 150 is built up. For particular examples, the width of slot 144, at its narrowest point, is 5% to 20% of the width of the respective micro-channel top 136. In addition, the slot 144 may be porous, in which case the "porous" slot 144 may have some connections, that is some spots or localities that have zero gap. Beneficially, the slots 144 provide stress relief for the coating 150.

As noted above, the component may comprise a turbine blade. For the example configuration shown in FIG. 12, the substrate 110 further defines a shank 96 integrally connected to the platform 92. For the configuration shown in FIG. 12, at least one passage 146 extends through the shank 96 and provides fluid communication between a respective hollow, interior space 114 and an exterior region of the shank 96. Typically, passage 146 would be formed by electro-discharge machining, or electro-chemical machining, and if large enough could be formed as part of the casting. In addition, for the configuration shown in FIG. 12, at least one access hole 148 extends at least partially through the platform 92 to provide fluid communication between the cooling channel 130 and the exterior region of the shank 96. For the illustrated arrangement of FIG. 12, the access channel 148 intersects the base 134 of the cooling channel 130. For the configuration shown in FIG. 12, the cooling channel 130 extends radially along the fillet 94 and exits at an upper end 95 of the fillet 94.

The benefits of the arrangement shown in FIG. 12 can be understood as follows. The shank pocket, that region of space defined by the shank and the platform underside, is pressurized by the coolant from passage 146 and allows a general level of cooling on the underside of the platform in addition to the cooling provided by the micro channels. This pressurization also keeps any hot gases from coming into this region. This provides a convenient cooling source for the micro channels, one where the passage 146 is not machined through the fillet and into the airfoil.

Referring now more generally, to all of the above-described cooling configurations, by placing cooling channels on the external surfaces of the fillets that conform to the surface curvature, the above-described cooling configurations beneficially allow the fillets to be increased in radius, while maintaining a lower metal temperature for better load carrying capability. In addition, the newly enabled increased fillet sizes will also improve the micro-structure of the coatings and reduce the potential for TBC spalls in these regions. Further, the above described fillet cooling is flexible from a design perspective, allowing cooling to be integrated into the fillets in virtually any orientation.

However, it should be noted that although the improved cooling of the fillets would enable the use of larger fillets, the invention is also applicable to conventionally sized fillets. For example, some existing parts may not require an increase in fillet size, but will still reap the other benefits due to micro-cooling channels. For example, the channels may have cooling supply holes drilled directly into the airfoil internal cavities, and the cooler substrate material will allow the intrusion of micro channels in the surface.

Another component 100 configuration is described with reference to FIGS. 2-4, 8-11, 13, 14. As shown, for example, in FIGS. 2 and 4, the component 100 includes a substrate 110 having an outer surface 112 and an inner surface 116. As indicated, for example in FIGS. 2 and 4, the inner surface 116 defines at least one hollow, interior space 114. As indicated in FIGS. 2 and 3, for example, the outer surface 112 of the substrate 110 defines a pressure sidewall 24 and a suction sidewall 26, where the pressure and suction sidewalls 24, 26 are joined together at a leading edge 28 and at a trailing edge 30 of the component 100 and together form an airfoil 90 portion of the component. As shown in FIGS. 2 and 3, the suction side 26 is convex-shaped, and the pressure side 24 is concave-shaped. As indicated in FIGS. 3 and 4, for example, the outer surface 112 of the substrate 110 further defines at least one platform 92 and at least one fillet 94 that extends between and integrally connects the airfoil 90 to the respective platform 92.

As shown in FIGS. 8 and 9, for example, the outer surface 112 defines one or more grooves 132 that extend at least partially along the respective platform 92. As indicated in FIGS. 8 and 9, for example, each groove 132 is in fluid communication with a respective hollow, interior space 114.

As indicated, for example, in FIGS. 2, 8 and 13, the component 100 further includes a coating 150 disposed over at least a portion of the outer surface 112 of the substrate 110. The coating 150 comprises at least a structural coating 54 and is described above. As indicated in FIG. 8, for example, the structural coating 54 extends over the groove(s) 132, such that the groove(s) 132 and the structural coating 54 together define one or more channels 130 for cooling the platform 94. Beneficially, the above described cooling configurations provide enhance cooling for the platform(s), which will help eliminate the need for cored platforms, thereby reducing expected costs for the component.

For the configuration shown in FIG. 3, the component 100 comprises a turbine blade 100, for the arrangement shown in FIG. 9, the substrate 110 further defines at least one access channel 140 that extends between and provides fluid communication between a respective hollow, interior space 114 and at least one cooling channel 130. Access channels 140 are described above.

There are a number of possible arrangements for the cooling channels 130. For the example configuration shown in FIG. 8, at least one of the cooling channels 130 extends axially and/or longitudinally along the platform 92. That is, the cooling channel 130 may extend axially, longitudinally, or both axially and longitudinally along the platform. Beneficially, this configuration provides enhanced cooling for the platform 92. For the illustrated configuration of FIG. 8, the cooling channel 130 exits in a vicinity of the platform end 98. However, for other configurations, the cooling channel 130 exits at an end 98 of the platform 92. This latter arrangement is not expressly shown. However, the platform end 98 is indicated in FIG. 8.

For the example configuration shown in FIG. 9, at least one of the cooling channels 130 extends radially along the fillet 94 and then extends axially and/or longitudinally along the platform 92. Beneficially, this configuration provides enhanced cooling for the fillet 94 and the platform 92. For the illustrated configuration of FIG. 9, the cooling channel 130 exits in a vicinity of the platform end 98. However, for other configurations, the cooling channel 130 exits at an end 98 of the platform 92. This latter arrangement is not expressly shown. However, the platform end 98 is indicated in FIG. 9.

As noted above, the component 100 may comprise a turbine blade. For the example configuration shown in FIG. 10, the substrate 110 further defines a shank 96 integrally connected to the platform 92. For the configuration shown in FIG. 10, at least one passage 146 extends through the shank 96 and provides fluid communication between a respective hollow, interior space 114 and an exterior region of the shank 96. As noted above, typically, passage 146 would be formed by electro-discharge machining, or electro-chemical machining, and if large enough could be formed as part of the casting. In addition, for the configuration shown in FIG. 10, at least one access hole 148 extends at least partially through the platform 92 to provide fluid communication between the cooling channel 130 and the exterior region of the shank 96. For the illustrated arrangement shown in FIG. 10, the access channel 148 intersects a base 134 of the cooling channel 130. The cooling channel 130 extends axially and/or longitudinally along the platform 92 and exits in a vicinity of the platform end 98, for the configuration shown in FIG. 10. However, the cooling channel 130 may also exit the platform end 98. This latter arrangement is not expressly shown. However, the platform end 98 is indicated in FIG. 10. Beneficially, by situating the micro channels in the platform, the arrangement shown in FIG. 10 provides improved cooling by placing the coolant closer to the hot gas path. This arrangement can reduce or eliminate the need for cast cooling passages or cavities inside the platform. This also reduces the amount of heat flux going into the coolant in the shank-platform cavity, allowing that fluid to simply perform the pressurization function prior to supplying the micro channels.

Another turbine blade 100 configuration is described with reference to FIG. 11. For the arrangement shown in FIG. 11, the substrate 110 further defines a shank 96 integrally connected to the platform 92 and at least one access hole 140 that extends at least partially through the shank 96 to provide fluid communication between a respective hollow, interior space 114 and a respective cooling channel 130, where the cooling channel extends axially and/or longitudinally along the platform 92 and exits in a vicinity of the platform end 98, for the configuration shown in FIG. 11. However, the cooling channel 130 may also exit the platform end 98. This latter arrangement is not expressly shown. However, the platform end 98 is indicated in FIG. 11. Beneficially, the cooling arrangement shown in FIG. 11 provides enhanced cooling for the platform 92, which will help eliminate the need for cored platforms, thereby reducing expected costs for the component As discussed above with reference to FIGS. 13 and 14, for particular configurations, the grooves 132 and cooling channels 130 may be re-entrant shaped. Similarly, and as discussed above with reference to FIG. 14, for particular configurations, the structural coating 54 defines one or more permeable slots 144, such that the structural coating does not completely bridge each groove 132. However, for other configurations, the structural coating 54 seals each groove 132.

As noted above, benefits of the above described cooled platform configurations include helping to eliminate the need for cored platforms, thereby reducing expected costs for the component.

A method of forming cooling channels 130 in a component 100 is described with reference to FIGS. 2-17. As described above with reference to FIGS. 2-4, the component 100 includes a substrate 110 having an outer surface 112 and an inner surface 116, where the inner surface 116 defines at least one hollow, interior space 114, and the outer surface 112 of the substrate 110 defines a pressure side wall 24 and a suction side wall 26. The pressure and suction side walls 24, 26 are joined together at a leading edge 28 and at the trailing edge 30 of the component 100. As shown in FIGS. 2 and 3, the suction side 26 is convex-shaped, and the pressure side 24 is concave-shaped. As indicated in FIGS. 3 and 4, for example, the outer surface 112 of the substrate 110 further defines at least one platform 92 and at least one fillet 94 that extends between and integrally connects the airfoil 90 to the respective platform 92.

As indicated in FIGS. 5 and 8-12, the method includes forming at least one groove in the outer surface 112 of the substrate 110 that extend at least partially along the fillet 94 or at least partially along the platform 92. Typically and as discussed above, the method further includes casting the substrate 110 prior to forming the groove(s) 132 in the outer surface 112 of the substrate 110.

As indicated in FIGS. 2, 5, 13 and 14, for example, the method further includes disposing a coating 150 over at least a portion of the outer surface 112 of the substrate 110. Coating 150 and example deposition techniques for disposing coating 150 are described above. However, for particular processes, the step of disposing the coating 150 over at least the portion of the outer surface 112 of the substrate 110 comprises performing an ion plasma deposition. For particular configurations, the coating 150 comprises a superalloy. For particular processes, the step of disposing the coating 150 over at least the portion of the outer surface 112 of the substrate 110 comprises performing a thermal spray process. Example thermal spray processes include high velocity oxygen fuel spraying (HVOF) and high velocity air fuel spraying (HVAF). For particular processes, the step of disposing the coating 150 over at least the portion of the outer surface 112 of the substrate 110 comprises performing a low pressure plasma spray (LPPS) process. As discussed above, the coating 150 comprises at least a structural coating 54 that extends over the groove(s) 132, such that the groove(s) 132 and the structural coating 54 together define one or more channels 130 for cooling at least one of the fillet 94 and the platform 92 of the component 100.

As indicated in FIGS. 5, 6, 11 and 13, the method further optionally includes forming at least one access hole 140 in the substrate 110, where each access hole 140 connects a respective groove 132 in fluid communication with the respective hollow interior space 114. As noted above, techniques for forming the access holes are provided in commonly assigned U.S. patent application Ser. No. 13/210,697, Ronald S. Bunker et al. For example, the access holes may be formed by abrasive liquid jet machining. Further, the interior access holes 140 may be drilled either as a straight hole of constant cross section, a shaped hole (elliptical etc.), or a converging or diverging hole.

As discussed above, for particular configurations, the grooves are re-entrant shaped. For particular processes, the re-entrant shaped grooves 132 are formed by directing an abrasive liquid jet 160 at the surface 112 of the substrate 110, as discussed in U.S. patent application Ser. No. 12/943,624, Bunker et al. and as illustrated, for example, in FIGS. 15-17. For example, the re-entrant shaped grooves 132 may be formed by directing the abrasive liquid jet 160 at a lateral angle relative to the surface 112 of the substrate 110 in a first pass of the abrasive liquid jet 160 (FIG. 15) and then making a subsequent pass at an angle substantially opposite to that of the lateral angle (FIG. 16). For particular processes, the step of forming the re-entrant shaped grooves 132 may further comprise performing at least one additional pass (FIG. 17) where the abrasive liquid jet 160 is directed toward the base 134 of the groove 132 at one or more angles between the lateral angle and the substantially opposite angle, such that material is removed from the base 134 of the groove 132. More generally, the re-entrant shaped grooves 132 may be formed using one or more of an abrasive liquid jet, plunge electrochemical machining (ECM), electric discharge machining (EDM) with a spinning electrode (milling EDM) and laser machining.

As noted above, using micro-channels to cool the fillet(s) and/or platform(s) provide significant benefits relative to conventional cast cooling passages. In particular, by placing cooling channels on the external surfaces of the fillets that conform to the surface curvature, the above described cooling configurations allow the fillets to be increased in radius, while maintaining a lower metal temperature for better load carrying capability. Moreover, larger fillets are not as restrictive to casting yields and thus decrease the cost of castings. In addition, the newly enabled increased fillet sizes will also improve the ceramic coating microstructure on the fillet regions, an area typically difficult for the control of microstructure during thermal spray processes. Further, the above described fillet and/or platform cooling is flexible from a design perspective, allowing cooling to be integrated into the fillets and/or platforms in virtually any orientation. Additionally, large fillet contouring would be expected to increase aerodynamic efficiency as well.

Although only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A component comprising:
   a substrate comprising an outer surface and an inner surface, wherein the inner surface defines at least one hollow, interior space, wherein the outer surface of the substrate defines a pressure sidewall and a suction sidewall, wherein the pressure and suction sidewalls are joined together at a leading edge and at a trailing edge of the component and together form an airfoil portion of the component, wherein the outer surface of the substrate further defines at least one platform and at least one fillet that extends between and integrally connects the airfoil to a respective one of the at least one platform, wherein the outer surface defines one or more grooves that extend at least partially in one of a substantially radial direction along a respective one of the at least one fillet or an axial-radial direction along a respective one of the at least one fillet, wherein each of the one or more grooves has a base and a length that extends at least partially along the surface of the substrate, and wherein each groove is in fluid communication with a respective hollow, interior space; and
   a coating disposed over at least a portion of the outer surface of the substrate, wherein the coating comprises at least a structural coating, wherein the structural coating extends over the one or more grooves, such that the one or more grooves and the structural coating together define one or more channels for cooling the respective fillet.

2. The component of claim 1, wherein the component comprises a turbine blade, and wherein the substrate further defines at least one access channel that extends between and provides fluid communication between a respective hollow, interior space and at least one cooling channel.

3. The component of claim 1, wherein each groove has an opening, and wherein each groove narrows at the opening of the groove and thus comprises a re-entrant shaped groove, such that each cooling channel comprises a re-entrant shaped cooling channel.

4. The component of claim 1, wherein the structural coating defines one or more permeable slots, such that the structural coating does not completely bridge each groove.

5. The component of claim 1, wherein the structural coating seals each groove.

6. The component of claim 1, wherein the component comprises a turbine blade, wherein the substrate further defines:
   a shank integrally connected to the platform;
   at least one passage that extends through the shank and provides fluid communication between a respective hollow, interior space and an exterior region of the shank; and
   at least one access hole that extends at least partially through the platform to provide fluid communication between the cooling channel and the exterior region of the shank, wherein the respective access hole intersects a base of the respective cooling channel, and
   wherein the respective cooling channel extends radially along the respective fillet.

7. The component of claim 6, wherein the cooling channel exits at an upper end of the respective fillet.

8. A component comprising:
   a substrate comprising an outer surface and an inner surface, wherein the inner surface defines at least one hollow, interior space, wherein the outer surface of the substrate defines a pressure sidewall and a suction sidewall, wherein the pressure and suction sidewalls are joined together at a leading edge and at a trailing edge of the component and together form an airfoil portion of the component, wherein the outer surface of the substrate further defines at least one platform and at least one fillet that extends between and integrally connects the airfoil to a respective one of the at least one platform, wherein the outer surface defines one or more grooves that extend at least partially in one of a substantially radial direction along a respective one of the at least one fillet or an axial-radial direction along a respective one of the at least one fillet, wherein each of the one or more grooves has a base and a length that extends at least partially along the surface of the substrate, and wherein each groove is in fluid communication with a respective hollow, interior space; and a coating disposed over at least a portion of the outer surface of the substrate, wherein the coating comprises at least a structural coating, wherein the structural coating extends over the one or more grooves, such that the one or more grooves and the structural coating together define one or more channels for cooling the respective platform.

9. The component of claim 8, wherein the component comprises a turbine blade, and wherein the substrate further defines at least one access hole that extends between and provides fluid communication between a respective hollow, interior space and at least one cooling channel.

10. The component of claim 8, wherein at least one of the cooling channels extends axially, longitudinally or a combination of axially and longitudinally along the respective platform.

11. The component of claim 10, wherein the cooling channel exits at an end of the respective platform.

12. The component of claim 10, wherein at least one of the cooling channels extends radially along the respective fillet and then extends axially, longitudinally or a combination of axially and longitudinally along the respective platform.

13. The component of claim 12, wherein the cooling channel exits at an end of the respective platform.

14. The component of claim 8, wherein the component comprises a turbine blade, wherein the substrate further defines:
  a shank integrally connected to the platform;
  at least one passage that extends through the and provides fluid communication between a respective hollow, interior space and an exterior region of the shank; and
  at least one access hole that extends at least partially through the respective platform to provide fluid communication between the cooling channel and the exterior region of the shank, wherein the respective access hole intersects a base of the respective cooling channel, and wherein the respective cooling channel further extends axially, longitudinally or a combination of axially and longitudinally along the respective platform.

15. The component of claim 14, wherein the cooling channel exits at an end of the respective platform.

16. The component of claim 8, wherein the component comprises a turbine blade, wherein the substrate further defines:
  a shank integrally connected to the platform; and
  at least one access hole that extends at least partially through the shank to provide fluid communication between a respective hollow, interior space and a respective cooling channel, wherein the cooling channel extends axially, longitudinally or a combination of axially and longitudinally along the respective platform.

17. The component of claim 16, wherein the cooling channel exits at an end of the respective platform.

18. The component of claim 8, wherein each groove has an opening, and wherein each groove narrows at the opening of the groove and thus comprises a re-entrant shaped groove, such that each cooling channel comprises a re-entrant shaped cooling channel.

19. The component of claim 8, wherein the structural coating defines one or more permeable slots, such that the structural coating does not completely bridge each groove.

20. The component of claim 8, wherein the structural coating seals each groove.

21. A method of forming cooling channels in a component comprising a substrate having an outer surface and an inner surface, wherein the inner surface defines at least one hollow, interior space, wherein the outer surface of the substrate defines a pressure side wall and a suction side wall, wherein the pressure and suction side walls are joined together at a leading edge and at the trailing edge of the component, and wherein the outer surface of the substrate further defines at least one platform and at least one fillet that extends between and integrally connects the airfoil to a respective one of the at least one platform, the method comprising:
  forming at least one groove in the outer surface of the substrate that extend at least partially in one of a substantially radial direction along a respective one of the at least one fillet or an axial-radial direction along a respective one of the at least one fillet, wherein each of the one or more grooves has a base and a length that extends at least partially along the surface of the substrate;
  disposing a coating over at least a portion of the outer surface of the substrate, wherein the coating comprises at least a structural coating, wherein the structural coating extends over the one or more grooves, such that the one or more grooves and the structural coating together define one or more channels for cooling at least one of the respective fillet and platform of the component.

22. The method of claim 21, further comprising casting the substrate prior to forming the grooves in the outer surface of the substrate.

23. The method of claim 21, wherein each groove has an opening, and wherein each groove narrows at the opening of the groove and thus comprises a re-entrant shaped groove, such that each cooling channel comprises a re-entrant shaped cooling channel.

24. The method of claim 23, wherein the re-entrant shaped grooves are formed by directing an abrasive liquid jet at the surface of the substrate.

25. The method of claim 21, further comprising forming at least one access hole in the substrate, wherein each access hole connects a respective one of the one or more grooves in fluid communication with the respective hollow interior space.

* * * * *

UNITED STATES PATENT AND TRADEMARK OFFICE
CERTIFICATE OF CORRECTION

PATENT NO. : 9,243,503 B2
APPLICATION NO. : 13/478517
DATED : January 26, 2016
INVENTOR(S) : Ronald Scott Bunker Page 1 of 1

It is certified that error appears in the above-identified patent and that said Letters Patent is hereby corrected as shown below:

In Column 6, Line 16, delete "(miffing EDM), and laser machining" and insert
-- (milling EDM), and laser machining. --, therefor.

In Column 9, Line 3, delete "channel" and insert -- channel. --, therefor.

In Column 10, Line 66, delete "platform 94." and insert -- platform 92. --, therefor.

In Column 15, Line 39, in Claim 14, delete "the and" and insert -- the shank and --, therefor.

Signed and Sealed this
Twenty-sixth Day of April, 2016

Michelle K. Lee
*Director of the United States Patent and Trademark Office*